United States Patent [19]

Franke

[11] 4,176,632

[45] Dec. 4, 1979

[54] INTERNAL COMBUSTION ENGINE

[76] Inventor: Walter Franke, Hittfelder Kirchweg 22, 2105 Seevetal 3, Fed. Rep. of Germany

[21] Appl. No.: 814,848

[22] Filed: Jul. 11, 1977

[30] Foreign Application Priority Data

Jul. 13, 1976 [DE] Fed. Rep. of Germany ........ 2631407

[51] Int. Cl.² ...................... F02B 47/02; F02D 19/02
[52] U.S. Cl. ............................. 123/75 B; 123/25 C; 123/188 B; 123/26
[58] Field of Search ............... 123/75 B, 25 C, 32 SP, 123/188 B, 143 A, 143 B, 26

[56] References Cited

U.S. PATENT DOCUMENTS

| | | | |
|---|---|---|---|
| 1,095,355 | 5/1914 | Ricardo et al. | 123/188 B |
| 1,810,917 | 6/1931 | Kreis | 123/75 B |
| 2,217,942 | 10/1940 | Cairns | 123/75 B |
| 2,879,753 | 3/1959 | McKinley | 123/25 C |
| 2,983,268 | 5/1961 | Heintz | 123/75 B X |
| 3,066,662 | 12/1962 | May et al. | 123/143 B |
| 3,124,113 | 3/1964 | May et al. | 123/143 A |
| 3,213,839 | 10/1965 | Gitlin et al. | 123/143 A |
| 3,479,997 | 11/1969 | Fryer et al. | 123/32 SP |
| 3,898,965 | 8/1975 | Fischer | 123/75 B |
| 3,991,729 | 11/1976 | Nataro | 123/75 B |
| 4,018,196 | 4/1977 | Linder et al. | 123/75 B |

FOREIGN PATENT DOCUMENTS 489569 10/1918 France ................. 123/188 B

Primary Examiner—Charles J. Myhre
Assistant Examiner—Jeffrey L. Yates
Attorney, Agent, or Firm—Toren, McGeady and Stanger

[57] ABSTRACT

An internal combustion engine of the Otto or Diesel type, with one or several cylinders and associated reciprocating pistons in any of the conventional cylinder arrangements. The working space of every cylinder is connected by a bore with a feed line including a valve for introducing into the cylinder during a piston suction stroke an additional fluid such as air or a liquid. The bore/valve assembly may be provided at the cylinder head and/or at the lateral wall of a cylinder. The valve includes a valve chamber of a relatively large cross-sectional area. In the valve chamber is movably guided a valve member for establishing or blocking communication between the valve chamber and the cylinder working space in dependence upon the pressure within the cylinder.

12 Claims, 8 Drawing Figures

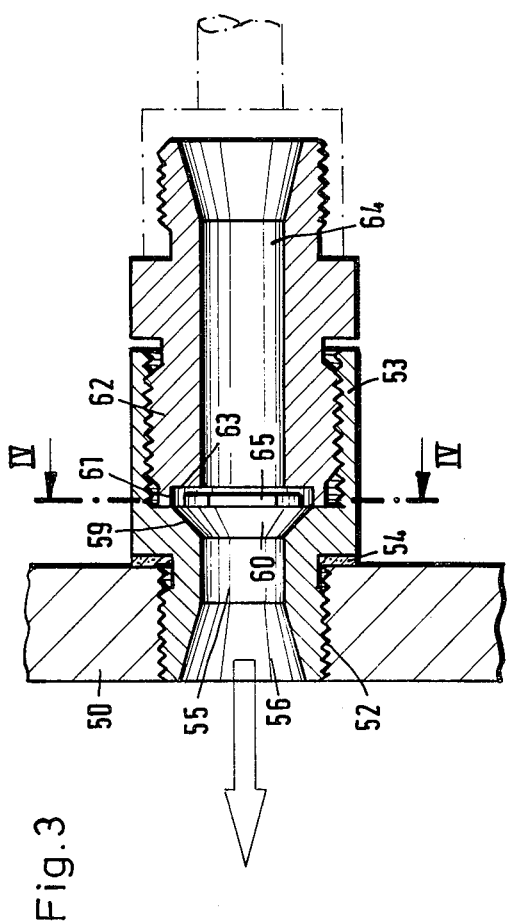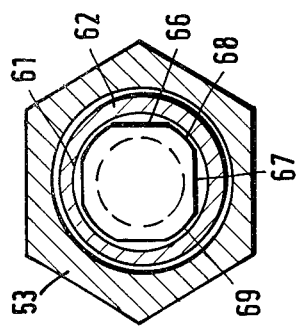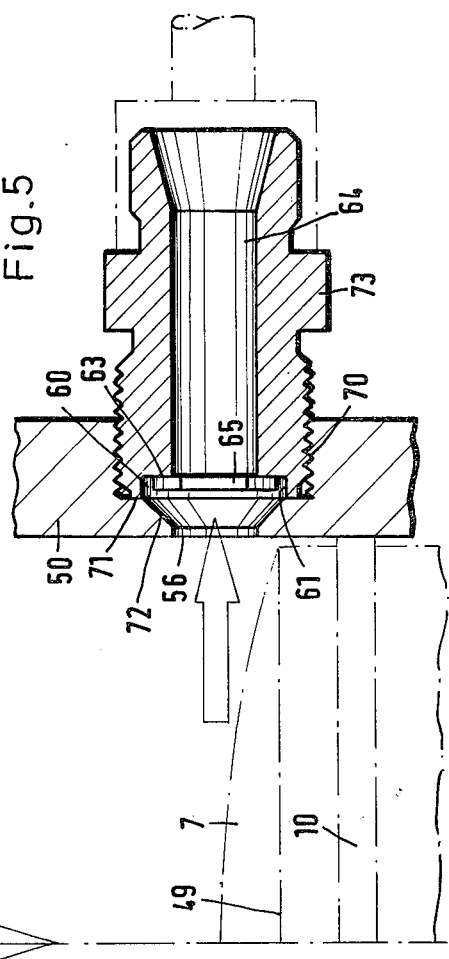

INTERNAL COMBUSTION ENGINE

The present invention relates to an internal combustion engine with at least one cylinder in which reciprocates a piston connected by a piston rod to a crankshaft whereby the working space of the at least one cylinder includes inlet and outlet valves controlled by a cam shaft, and at least one fuel intake or fuel injection device respectively is arranged in the cylinder head.

Internal combustion engines of the above described type are already known. The present invention is particularly applicable to a Diesel engine in which air is taken in through the inlet valve.

Heretofore, it has already been proposed to take in an additional fluid into the working space of the internal combustion engine by the suction stroke of the piston. It is already known to feed an additional medium such as water into the manifold of a four-stroke Otto type internal combustion engine. This additional water leads to an atomization of the fuel supplied by the carburetor, with the result that the ignition quality of the fuel is impaired, due to the increased or higher moisture content.

The present invention may be practised particularly in a Diesel engine but likewise generally in all types of internal combustion engines, i.e. also in Otto type engines, by providing at least one special valve by which an additional fluid may be introduced directly into the working space of the cylinder.

In accordance with a preferred embodiment of the present invention, this fluid medium may be air and/or a liquid. As a liquid may be employed water. Preferably is employed an emulsion known as drilling oil the composition of which is optionally 1 part of engine oil for every 50 parts of water. The present invention has as an object to improve an internal combustion engine of the type as stated at the outset of the present specification and as above described, in providing not only a special valve assembly but also an improved internal combustion engine of any deisred type, and especially a valve assembly for a new type of Diesel engine.

Although the present invention is described with reference to an internal combustion engine having at least one cylinder in which reciprocates a piston, it will be self-understood that the present invention is likewise applicable to multi-cylinder engines of any type of cylinder arrangement such as in-line engines, V-engines or opposed cylinder-type engines.

This object is achieved, in accordance with the present invention, by the expedient of a bore through the cylinder wall in at least one location of the cylinder working space, the bore adapted to permit the passage of an additional fluid medium, air or a liquid, directly into the working space, under the suction effect generated by the piston when the piston moves toward its bottom dead center position, a valve connected in a feed line including a valve chamber disposed immediately adjacent the cylinder wall or in the vicinity thereof, the cross-sectional area of this valve chamber exceeding the cross-sectional area of the feed line, the valve chamber communicating by the bore with the cylinder working space, and a freely floating valve member disposed in the valve chamber, a seat for the valve member being provided by a wall portion of the valve chamber adjacent the feed line.

This arrangement provides two results. On the one hand there has been provided a valve of an extremely sensitive response threshold that advantageously will not be interfered with even by the springs employed in conventional check valves but the sensitivity of response ensures the proper functional positioning in opening or blocking the feed line. This moreover provides the conditions for improving a Diesel engine to not only automatically supercharge the same, by the above stated design, in utilizing the functional factors of the working space, but especially in providing a layer charge that may be provided two-fold, i.e. on the one hand directly above the head surface of the piston and in the fuel injection region. By introducing directly the additional fluid such as particularly a liquid, the invention provides a deposit directly on the piston and within the cylinder so that the fluids injected or taken in during normal operation will not be atomized.

In a particularly preferred embodiment a freely floating disk-shaped valve member of a diameter substantially corresponding to the internal diameter of the valve chamber is freely movable within the valve chamber, and the valve chamber includes a wall portion adjacent the feed line and extending perpendicularly thereof whereby the disk-shaped valve member is adapted to engage this wall portion by one face. This arrangement improves the introduction of the additional fluid still further since the disk-shaped valve member is of an extremely high response sensitivity and has a small inertia.

Because of this manner of introducing the additional fluid which may consist of air or particularly of a liquid, there will not only be obtained a cooling effect of the working surfaces but likewise an additional lubrication if the liquid consists of an emulsion that may advantageously be composed of about 1 part of engine oil and 300 to 400 parts of water. In any case, i.e. independently of the type of fluid employed, the ignition quality of the fuel is not reduced, and by the spatial arrangement of this additional fluid ignition effects are rather increased in view of an improved fuel efficiency.

Advantageously the valve chamber includes a cylindrical boundary wall and the disk-shaped valve member is of a substantially square configuration with rounded corner portions of a radius of curvature that is somewhat smaller than the inner radius of curvature of the valve chamber. This configuration results in substantial passage cross-sectional areas at the straight line portions of the disk edges so that when the disk-shaped valve member lifts away from its blocking position against the valve seat, a passage of a substantial cross-sectional area through the valve is immediately available. In this position, the rounded corner portions provide sufficient guidance.

Advantageously, the valve chamber includes a wall portion adjacent the feed line and extending perpendicularly thereof. The disk-shaped valve member is adapted to engage this perpendicularly extending wall portion by one face. At the opposite side may be provided a conically enlarged wall portion adjacent the port connecting to the working space. This ensures a perfectly blocking seating position when the working space of the cylinder is under a positive pressure whereas during a suction stroke of the piston the cross-sectional area of the passage is relatively large.

This conically enlarged wall portion may be part of a valve armature that defines this valve chamber. In a particularly preferred arrangement, the conically enlarged wall portion is directly part of the cylinder wall, and this cylinder wall includes a threaded bore into which is threadedly mounted a valve armature. With this arrangement the valve may be arranged in close proximity to the internal surface of the cylinder wall so that the remaining dead space of the working space is reduced to a minimum. This is favorable to the performance of the engine.

In a suitable embodiment the disk-shaped valve member is of a thickness in a range of from about 0.1 to 1 mm, and the valve chamber at the cylindrical wall portion is of a depth of about 0.8 to 2 mms. This allows to reduce the mass of the disk-shaped valve member to a minimum, in providing a sufficient movability, and this likewise with respect to the above described embodiments of the valve chamber wall configuration. The movability of the disk may be enhanced by providing the disk at an undersize of about 10% with respect to the cylindrical wall portion of the valve chamber. The feed line may be nozzle-shaped and of a diameter in the range of from 0.2 to 1 mm. This allows also at small dimensions a perfect sealing. If the fluid source and thereby the feed line is pressurized, the disk-shaped valve member may move readily since in this case the disk will be hit fully by the jet of fluid discharged from the nozzle-type feed line.

Preferably, the disk is made of a metal such as sheet metal, steel or the like. Alternately, the disk may likewise be made of another suitable material offering a sufficient resistance against the parameters of interest.

Preferably, the valve may be arranged at the cyl9nder head. With this arrangement, the additional fluid will also be taken in throughout the overall suction stroke of the piston. In a particularly advantageous embodiment the valve is arranged at the lateral cylinder wall at a point past which moves the piston head in a position of the crank arm for which the crankshaft includes an angle of from 60° to 90° with its bottom dead center position. In all cases, wheter the fluid taken in is air or a liquid such as particularly an emulsion, a layer charge will be established immediately above the piston face wall, i.e. in a position spaced from the inlet valve or respectively the injector device. When introducing a liquid, this liquid will precipitate on the piston and on the lateral cylinder walls immediately adjacent the piston in its bottom dead center position, in providing a suitable cooling effect. The fuel mixture or respectively the injected fuel will not be atomized, in thereby retaining the ignition quality of the fuel. The distributed precipitated fluid supports the effects by or after ignition of the fuel.

In a particularly advantageous embodiment, a valve mounted in the cylinder head is connected to a liquid source. It is particularly advantageous to take in a liquid such as particularly an emulsion during the whole suction stroke. Due to the specific properties of the liquid during the suction stroke in the working space, the simultaneously introduced fuel will not be atomized and the liquid will precipitate at the cylinder wall or respectively on the piston head surface. Advantageously may be used an emulsion consisting of 1 part of engine oil for every 300 to 400 parts of water. This leads to particularly favorable conditions under the above described aspects.

Furthermore, it is preferred to connect the valve arranged in the lateral cylinder wall to an air filter. By this arrangement there will suitably be obtained, optionally in combination with the above described liquid feed, an initial layer charge including air immediately above the piston head surface.

In the particularly preferred embodiment in which the internal combustion engine consists of a Diesel engine, there may be taken in additional fluid such as air and/or a liquid by the pressure conditions existing in the working space. This already leads to an improvement of heretofore known Diesel engines. This improvement may further be enhanced by providing a check valve of the type described above at the cylinder head and/or in the cylinder wall. This does of course not exclude that the invention will likewise exhibit substantial advantages in an Otto engine.

When the valve is mounted at the cylinder wall, the valve may be connected to a liquid source whereby the liquid employed is preferably an emulsion of the above indicated composition.

According to a particular arrangement, a valve assembly in the form of a double acting valve or optionally a tandem valve arrangement is provided at the cylinder head and/or at the cylinder wall. This valve assembly includes a valve member disposed within an enlarged valve housing whereby the feed line of this valve assembly is connected to a pressurized fluid source. According to the actual arrangement and in dependence upon a positive or a negative pressure within the cylinder, a charge of the fluid will be taken in, and this is particularly advantageous in the operation of the internal combustion engine also of a Diesel type.

In accordance with one embodiment there are provided check valves having a valve member that is being urged against a valve seat by separate individual biasing springs. The valve seats are provided at opposite wall portions adapted to guide the respective valve members therebetween. According to the arrangement of the valve seats, the feed flow will be established by a positive or a negative pressure. The alternately operating valve members may of course be coupled and guided by a spring. Particularly preferred is a valve assembly of disk-shaped check valves as described above and in the following because such an embodiment constitutes a particularly simple arrangement that is adapted particularly to a negative pressure dependent feed, i.e. a feed flow in dependence upon the suction effects of the piston.

In the following the present invention will be described with reference to several embodiments which are illustrated schematically in the appended drawings. These embodiments illustrate particularly advantageous applications.

In all figures of the drawings similar or mutually corresponding parts are designated by the same reference numerals.

In the drawings:

FIG. 3 is a fragmentary lateral elevational view of a preferred embodiment of a valve assembly at the cylinder walls;

FIG. 4 is a cross-sectional view of FIG. 3 along the line IV—IV;

FIG. 5 is a fragmentary elevational sectional view similar to FIG. 3 but illustrating another embodiment of a valve assembly whereby in both FIGS. 3 and 5 particular pressure conditions are indicated in connection with a piston assembly shown in chain-dotted lines;

Figure 1:
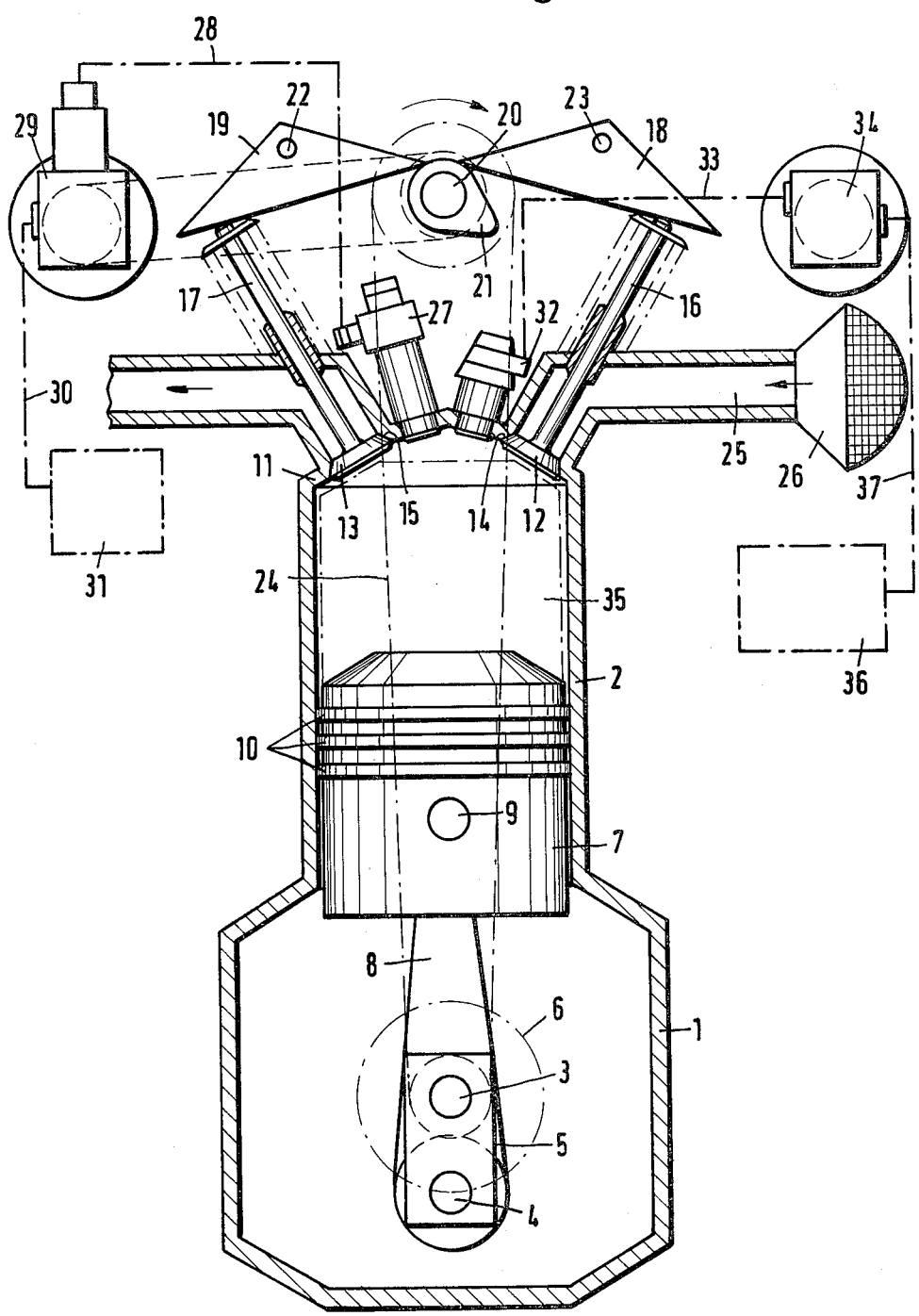
FIG. 1 is a schematical sectional view of an internal combustion engine and illustrates a cylinder of an engine which may consist of several in-line disposed cylinders, and whereby the associated aggregates are only schematically shown.
Figure 2:
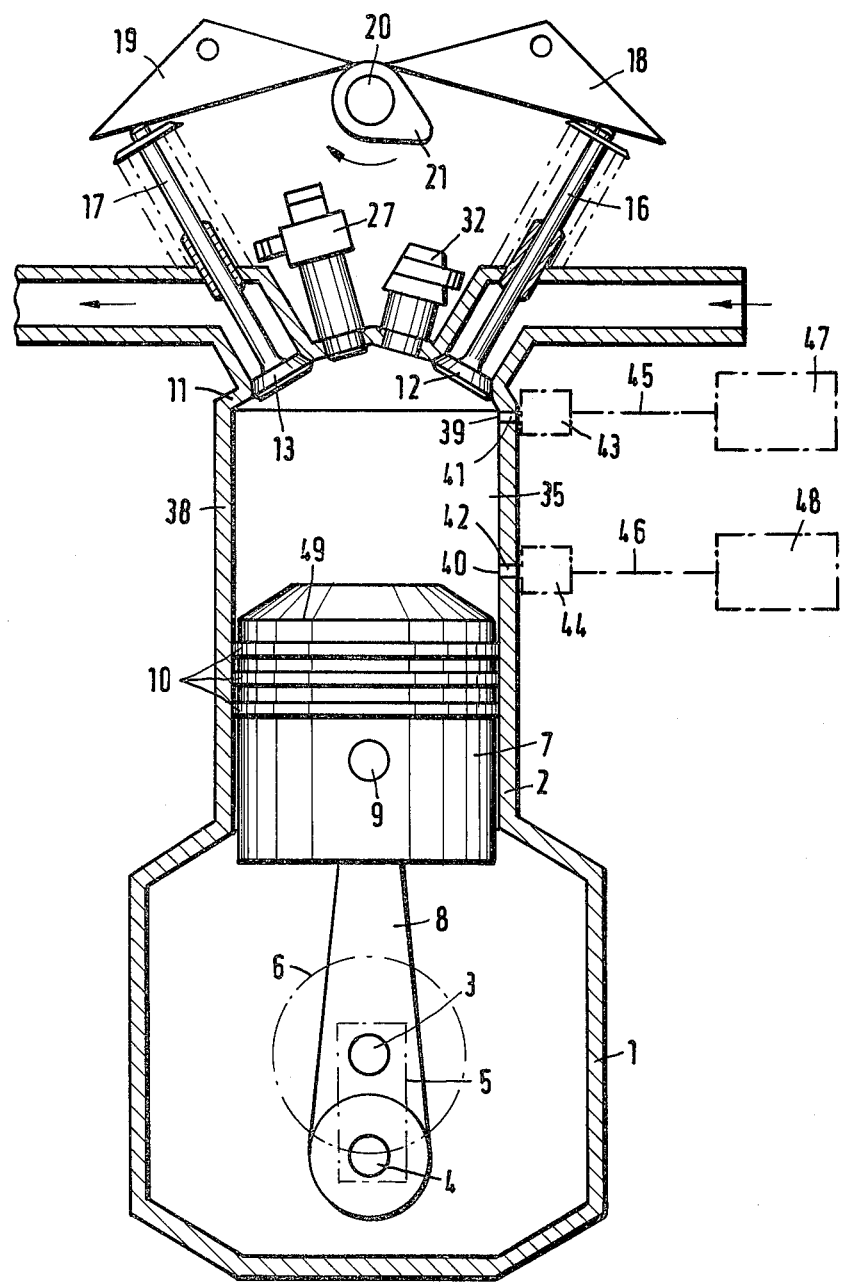
FIG. 2 is a view similar to FIG. 1 but simplified and illustrates additional means.

Referring initially to FIGS. 1 and 2, these FIGS. represent sectional views of an in-line internal combustion engine. A crankshaft housing 1 mounts several in-line disposed cylinders 2 whereby the cylinder walls are indicated by the same reference numeral. In the crankshaft housing is journalled a crankshaft 3 at face wall portions (not shown) extending parallel of the plane of the drawing. Underneath each cylinder wall 2, the crankshaft includes a crankpin 4, and this crankpin 4 is connected by a crank arm 5 to the crankshaft 3. The crankpin 4 moves through a circular motion path 6 and is shown in FIGS. 1 and 2 in a position in which a piston 7 is in its bottom dead center position. The piston 7 is connected to the crankpin 4 by a piston rod 8. The piston rod 8 is rotatably connected to the gudgeon pin 9 of the piston at its one end, and to the crankpin 4 at its other end. The piston 7 is guided within the cylinder 2 is a sealing relationship by piston rings 10.

The cylinder 2 is closed at its upper end by the cylinder head 11 which is only schematically shown. In the cylinder head are disposed an inlet valve 12 for admitting e.g. air, and an outlet valve 13. These valves are guided in valve seats 14, 15 in the cylinder head, by means of valve shafts 16, 17, and are biased by springs against rocker levers 18, 19 adapted to be actuated by a cam shaft 20 having an actuating cam 21. The rocker levers may rotate about pivot pins 22, 23 in the motor. The cam shaft 20 is connected to the crank shaft 3 by a transmission gear such as e.g. a toothed belt drive 24.

In the preferred but not exclusive embodiment of the internal combustion engine as a Diesel engine, the inlet valve 12 is connected to a duct 25 having at its end an air filter 26 through which air may be taken in. An injection device 27 opens into the cylinder head 11 and is connected by a fuel line 28 to a pressurited fuel source 29 which may periodically inject fuel in accordance with the cycle of the engine. The fuel source 29 is connected to a fuel reservoir 31 by a fuel line 30. The cylinder head 11 furthermore mounts a valve assembly 32 which is further described below, and this valve assembly is connected to a fluid reservoir 34 through a line 33. The fluid reservoir 34 may be pressurized so that the valve assembly 32 is biased continuously by a pressure opposing the pressure within the working space 35 of the cylinder. Alternatively, the fluid reservoir may be at ambient pressure, and this will be preferred especially if the suction effect of the piston 7 is utilized.

When the fluid reservoir 34 is pressurized, a pump 36 may be connected thereto by a line 37.

The valve assembly 32 may be arranged as shown in FIGS. 3 to 5 or in FIG. 6, and this will be described further below.

Referring to FIG. 2 in which similar parts are identified by the same reference numerals as in FIG. 1, there are provided at the lateral cylinder wall 38 two bores 41, 42 communicating with the working space 35 by ports 39, 40. At these bores are arranged valve assemblies 43, 44. These valve assemblies are each connected to a fluid source 47, 48 respectively by a line 45, 46 respectively. The fluid of these sources may be a liquid such as an emulsion or air. The preferred embodiment is as stated above.

The bore 41 is disposed immediately adjacent the cylinder head 11. The other bore 42 is disposed in a height with respect to the path of the piston 7 so that the upper edge 49 of the piston moves past the corresponding port 40 when the crank arm 5 is a position of from 60° to 90° ahead of the bottom dead center position, i.e. of the bottom position shown in FIG. 2.

The valve assemblies 43, 44 but likewise the valve assembly 32 are preferably of a type as shown in FIGS 3 to 5. In FIGS. 3 and 5 are shown the side wall 50 of the cylinder 2 and the piston 7 reciprocating in the direction of the double headed arrow 51.

In the embodiment of FIG. 3 the cylinder wall 50 is provided with a threaded bore 52 into which is threadedly engaged an adapter armature 53, with the interposition of a gasket 54. This adapter armature 53 includes a bore 55 and the port 56 opening into the cylinder 2. The port 56 is preferably conically enlarged. At its end facing away from the cylinder, the bore 55 includes an oppositely directed conically enlarged wall portion 59 defining one side of the valve chamber 60. This valve chamber 60 includes a cylindrical wall portion 61 forming part of another valve armature 62. To the rear of this cylindrical wall portion 61 is disposed a wall portion 63 that extends perpendicuarly of the wall portion 61 and into which opens centrally the feed conduit 64. Within the valve chamber 60 defined by the cylindrical wall portion 61 is floatingly guided a disk-shaped valve body 65. This disk is of a substantially rectangular configuration with the straight side walls 66, 67 and the rounded corner portions 68, 69 whereby the radius of curvature of the rounded corner portions is somewhat smaller than the radius of curvature of the cylindrical wall portion 61. The disk 65 is of a sufficient size to cover the opening of the feed conduit 64 and avoid from being expelled through the bore 55.

As shown in FIGS. 3 and 4, the actual valve assembly with the disk 65 is arranged externally of the cylinder wall 50. As may be seen, the disk 65 is in the position shown in FIG. 3 when the piston 7 moves toward the right, i.e. in the right hand direction of the double headed arrow 51.

The dead space at the working space of the cylinder is relatively large.

Referring to FIG. 5, a threaded blind bore 70 extends immediately into the cylinder wall 50 and provides at its inner end a shoulder 71 from which extends a conically tapered wall portion 72 as part of a bore leading to the port 56. This conical wall portion 72 defines part of the valve chamber 60, the cylindrical wall portion 61 of which is defined within an armature 73 threaded into the threaded bore 70. Within the valve chamber 60 is movably disposed the disk-shaped valve member 65 as above described. The armature 73 defines in this embodiment the wall portion 63, and the feed conduit 64 extends through this armature 73.

In FIG. 5 the disk 65 is shown in a position when the piston 7 moves toward the left hand side of the double headed arrow 51, i.e. when a positive pressure is exerted through the port 56.

The valve arrangements shown in FIGS. 3 to 5 do not include any complicated guide means for the valve member 65 and constitute a highly sensitive valve arrangement that may be disposed in close vicinity of the cylinder working space and is particularly advantageous for the purposes of the present invention.

A valve assembly of this type is preferred for internal combustion engines of all types. In particularly Diesel engines there may likewise be employed a valve assembly of the type shown in FIG. 6 and as indicated in FIG. 2 by the reference numeral 32. The cylinder head wall is indicated by the reference numeral 74. In this cylinder head wall is threadedly mounted a valve housing armature 75 with a valve seat 76. The valve assemblies 43, 44 of FIG. 2 may selectively be mounted in the same manner. The valve housing armature 75 is connected to a housing counter armature 77 to which is connected a feed line 78 leading to a pressurized fluid source 79. The feed line 78 is threadedly connected through an adapter 80 defining a valve seat 81 opposing the valve seat 76. In the housing counter armature 77 may be supported, by radial wall portions 82, a center member 83 defining a transverse walo 84 with a passage 85. From this transverse wall 84 extend on opposite sides guide wall portions 86, 87 for guiding biasing springs 88, 89. These biasing springs 88, 89 urge conical valve members 90, 91 against the valve seats 76, 81. Valve member stems 92, 93 surrounded by the biasing springs serve to guide the valve members.

If the valve is closed at 76, 91 and the positive pressure of the pressurized fluid source 79 overcomes the biasing pressure of the spring 79, the inner space of the valve assembly will be flooded by fluid discharged from the source 79. When the pressure within the working space increases, the valve member 91 will be lifted away from its seat 76 and simultaneously the valve member 90 will be urged against its valve seat 81 whereby the fluid within the valve housing may enter the cylinder working space. In this manner the introduction of fluid may be metered. When the pressure in the cylinder working space decreases, the valve member 91 again engages its valve seat 76 so that at a sufficiently high pressure from the fluid source 79 the internal cavity of the armature may be filled by a metered quantity.

Figure 6:
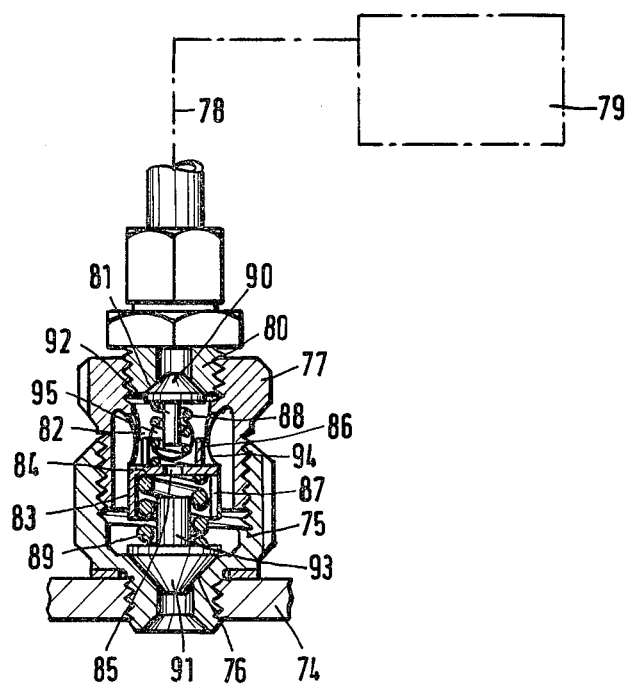
FIG. 6 is a cross-sectional view of another valve assembly that is particularly advantageous to a Diesel engine and may be mounted at the cylinder head or at the cylinder wall.
Figure 7:
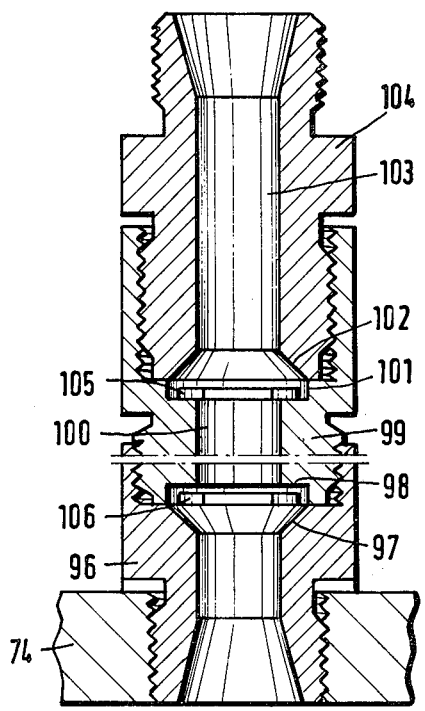
FIGS. 7 and 8 are views similar to FIG. 6 of modified valve assemblies.
Figure 8:
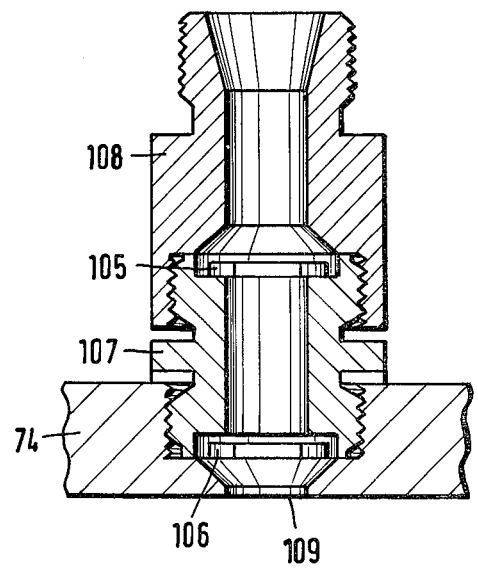

FIG. 6 thus illustrates a suitable arrangement. In FIG. 7 is illustrated an advantageous economical modification by employing the valve means of FIGS. 3 to 5. In FIGS. 7 and 8 the cylinder wall is likewise indicated by the reference numeral 74. The valve housing armature 96 is threadedly engaged into the threaded bore of the cylinder wall 74, and in the embodiment of FIG. 7 this valve housing armature 96 includes at the side facing away from the cylinder a conical portion 97 that delimits a valve chamber. The other part of this valve chamber is defined by the recess 98 of a housing counter armature 99 through which extends a bore 100. The end of this bore 100 facing away from the recess likewise includes a shoulder type recess 101. This recess 101 defines a second valve chamber together with a conical portion 102 at the end of the passage 103 of an adapter 104. In the valve chambers are provided disk-shaped valve members 105, 106 respectively of a type as described with reference to the embodiments shown in FIGS. 3 to 5 and with the above described dimensions.

The length of the bore 100 allows to determine the space in which may be collected a predetermined charge intended to be introduced into the cylinder.

In the embodiment of FIG. 8 the conical portion 117 corresponding to the conical portion 97 has been provided directly in the cylinder wall 74 so that in this embodiment are merely provided an armature 107 corresponding to the housing counter armature 99 of FIG. 7 and an adapter 108 for the connection to a fluid source.

Having regard to the explanations of FIG. 7 it is not believed necessary to explain the embodiment of FIG. 8 more in detail since the latter likewise consists of two valve chambers with disk-shaped valve members 105, 106 but fewer components, and the overall assembly is more proximate to the inlet port 109 at the cylinder.

In a double wall type cylinder wall for cooling purposes e.g. the housing armature 96 may be designed so as to extend through the double walls, and the same likewise applies to the armature 107 shown in FIG. 8.

The illustrated means disclose a valve assembly of a highly sensitive response and of reliable operation, without additional guide or control means whereby an adjustable adaptation is readily possible.

By the arrangement of the conical portions the direction of passage may be determined in dependence upon the pressure within the cylinder whereby in the here illustrated embodiments in which the conical portions are at the cylinders the charge stored in in tandem valve arrangement will be drawn into the cylinder by a negative pressure whereby the second disk-shaped valve member simultaneously seals.

What is claimed is:

1. An internal combustion engine including cylinder means, piston means operably engaged within said cylinder means, said cylinder means having wall means defining a cylinder working space within which said piston means are reciprocally movable, fuel injection means for delivering fuel mixture to said cylinder means, exhaust means for exhausting spent fuel from said cylinder means, and inlet means for introducing into said cylinder working space an additional fluid medium consisting of at least one of the media air and liquid, said inlet means comprising: a bore extending through said cylinder wall means in at least one location of said cylinder working space and adapted to permit passage therethrough of said additional fluid medium directly into said cylinder working space under a suction effect generated by said piston means moving toward a bottom dead center position of its working stroke; a feed duct connected to a source of said additional fluid medium; a valve chamber disposed immediately adjacent said feed duct and in direct flow communication therewith, said valve chamber having a diameter which is greater than the diameter of said feed duct; a conical wall portion extending from said valve chamber on the side thereof toward said cylinder working space and extending in a tapering configuration narrowing toward said cylinder working space to a diameter smaller than said diameter of said valve chamber; and a valve disk arranged within said valve chamber to be freely movable therein, said valve disk having a diameter which is larger than both said diameter of said feed duct and said small diameter of said conical wall portion to define the limits of free movement of said valve disk within said valve chamber; said valve chamber being formed with a cylindrical wall defining the radially outer limits of said chamber and said valve disk being formed with a generally square configuration having rounded corner portions defined with a radius of curvature which is smaller than the radius of said cylindrical wall.

2. An internal combustion engine according to claim 1 wherein said valve chamber is formed with an annular boundary wall at which said feed duct terminates and against which said valve disk abuts to limit its free movement within said valve chamber in a direction away from said cylinder working space.

3. An internal combustion engine according to claim 1 wherein said cylinder wall means is formed with an internally threaded bore and wherein said conical wall portion is defined by a valve armature which is threadedly engaged within said bore.

4. An internal combustion engine according to claim 1 wherein said cylinder means is formed to include a cylinder head portion and wherein said inlet means is arranged in said cylinder head portion.

5. An internal combustion engine according to claim 1 wherein said cylinder wall means include a lateral cylinder wall and wherein said piston means include a crank arm and a crank shaft, said piston means having a bottom dead center position in its working stroke, said inlet means being located in said lateral cylinder wall at a point past which the piston means move in a position of said crank arm for which said crank shaft includes an angle of from 60° to 90° ahead of its bottom dead center position.

6. An internal combustion engine according to claim 5 wherein said inlet means include an air filter.

7. An internal combustion engine according to claim 1 wherein said internal combustion engine is a diesel engine and wherein said liquid is an emulsion.

8. An internal combustion engine according to claim 7 wherein said emulsion contains one part engine oil for 300 to 400 parts of water.

9. An internal combustion engine including cylinder means, piston means operably engaged within said cylinder means, said cylinder means having wall means defining a cylinder working space within which said piston means are reciprocally movable, fuel injection means for delivering fuel mixture to said cylinder means, exhaust means for exhausting spent fuel from said cylinder means, and inlet means for introducing into said cylinder working space an additional fluid medium containing of at least one of the media air and liquid, said inlet means comprising: a bore extending through said cylinder wall means in at least one location of said cylinder working space and adapted to permit passage therethrough of said additional fluid medium directly into said cylinder working space under a suction effect generated by said piston means moving toward a bottom dead center position of its working stroke; a feed duct connected to a source of said additional fluid medium; a valve chamber disposed immediately adjacent said feed duct and in direct flow communication therewith, said valve chamber having a diameter which is greater than the diameter of said feed duct; a conical wall portion extending from said valve chamber on the side thereof toward said cylinder working space and extending in a tapering configuration narrowing toward said cylinder working space to a diameter smaller than said diameter of said valve chamber; and a valve disk arranged within said valve chamber to be freely movable therein, said valve disk having a diameter which is larger than both said diameter of said feed duct and said small diameter of said conical wall portion to define the limits of free movement of said valve disk within said valve chamber; said valve disk being formed with a thickness of between 0.11 to 1 mm. and said valve chamber being formed with a cylindrical wall portion extending circumferentially about said disk, said cylindrical wall portion having a depth of between 0.8 to 2 mm.

10. An internal combustion engine including cylinder means, piston means operably engaged within said cylinder means, said cylinder means having wall means defining a cylinder working space within which said piston means are reciprocally movable, fuel injection means for delivering fuel mixture to said cylinder means, exhaust means for exhausting spent fuel from said cylinder means, and inlet means for introducing into said cylinder working space an additional fluid medium consisting of at least one of the media air and liquid, said inlet means comprising: a bore extending through said cylinder wall means in at least one location of said cylinder working space and adapted to permit passage therethrough of said additional fluid medium directly into said cylinder working space under a suction effect generated by said piston menas moving toward a bottom dead center position of its working stroke; a feed duct connected to a source of said additional fluid medium; a valve chamber disposed immediately adjacent said feed duct and in direct flow communication therewith, said valve chamber having a diameter which is greater than the diameter of said feed duct; a conical wall portion extending from said valve chamber on the side thereof toward said cylinder working space and extending in a tapering configuration narrowing toward said cylinder working space to a diameter smaller than said diameter of said valve chamber; and a valve disk arranged within said valve chamber to be freely movable therein, said valve disk having a diameter which is larger than both said diameter of said feed duct and said small diameter of said conical wall portion to define the limits of free movement of said valve disk within said valve chamber; said valve disk being formed with an outer circumferential dimension which is about 10% smaller than a cylindrical wall portion of said valve chamber extending circumferentially about said disk.

11. An internal combustion engine including cylinder means, piston means operably engaged within said cylinder means, said cylinder means having wall means defining a cylinder working space within which said piston means are reciprocally movable, fuel injection means for delivering fuel mixture to said cylinder means, exhaust means for exhausting spent fuel from said cylinder means, and inlet means for introducing into said cylinder working space an additional fluid medium consisting of at least one of the media air and liquid, said inlet means comprising: a bore extending through said cylinder wall means in at least one location of said cylinder working space and adapted to permit passage therethrough of said additional fluid medium directly into said cylinder working space under a suction effect generated by said piston means moving toward a bottom dead center position of its working stroke; a feed duct connected to a source of said additional fluid medium, said feed duct being formed with a nozzle-shaped configuration and with a diameter in the range of from 0.2 to 1 mm; a valve chamber disposed immediately adjacent said feed duct and in direct flow communication therewith, said valve chamber having a diameter which is greater than the diameter of said feed duct; a conical wall portion extending from said valve chamber on the side thereof toward said cylinder working space and extending in a tapering configuration narrowing toward said cylinder working space to a diameter smaller than said diameter of said valve chamber; and a valve disk arranged within said valve chamber to be freely movable therein, said valve disk having a diameter which is larger than both said diameter of said feed duct and said small diameter of said conical wall portion to define the limits of free movement of said valve disk within said valve chamber.

12. An internal combustion engine including cylinder means, piston means operably engaged within said cylinder means, said cylinder means having wall means defining a cylinder working space within which said piston means are reciprocally movable, fuel injection means for delivering fuel mixture to said cylinder means, exhaust means for exhausting spent fuel from said cylinder means, and inlet means for introducing into said cylinder working space an additional fluid medium consisting of at least one of the media air and liquid, said inlet means comprising: a bore extending through said cylinder wall means in at least one location of said cylinder working space and adapted to permit passage therethrough of said additional fluid medium directly into said cylinder working space under a suction effect generated by said piston means moving toward a bottom dead center position of its working stroke; a feed duct connected to a source of said additional fluid medium; a valve chamber disposed immediately adjacent said feed duct and in direct flow communication therewith, said valve chamber having a diameter which is greater than the diameter of said feed duct; a conical wall portion extending from said valve chamber on the side thereof toward said cylinder working space and extending in a tapering configuration narrowing toward said cylinder working space to a diameter smaller than said diameter of said valve chamber; a valve disk arranged within said valve chamber to be freely movable therein, said valve disk having a diameter which is larger than both said diameter of said feed duct and said small diameter of said conical wall portion to define the limits of free movement of said valve disk within said valve chamber; another valve chamber disposed immediately adjacent said feed duct and in direct flow communication therewith on the side of said feed duct opposite said valve chamber, said another valve chamber having a diameter which is greater than the diameter of said feed duct; a conical wall portion extending on the side of said another valve chamber away from said cylinder working space and tapering in a configuration narrowing away from said cylinder working space to a diameter smaller than said diameter of said another valve chamber; and another valve disk arranged within said another valve chamber to be freely movable therein, said another valve disk having a diameter which is larger than both said diameter of said feed duct and said smaller diameter of said conical wall portion extending from said another valve chamber to define the limits of free movement of said another valve disk within said another valve chamber.

* * * * *